(12) United States Patent
Albero et al.

(10) Patent No.: US 12,335,294 B2
(45) Date of Patent: Jun. 17, 2025

(54) SYSTEM FOR CONTAINERIZATION-BASED COUNTERMEASURES TO CYBERSECURITY VULNERABILITIES

(71) Applicant: BANK OF AMERICA CORPORATION, Charlotte, NC (US)

(72) Inventors: George Anthony Albero, Charlotte, NC (US); Kristoffer Matthew Bertsch, Wilmington, DE (US); Jinna Zevulun Kim, Charlotte, NC (US); Maharaj Mukherjee, Poughkeepsie, NY (US); Timothy Scott Murphy, Charlotte, NC (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 292 days.

(21) Appl. No.: 18/119,109

(22) Filed: Mar. 8, 2023

(65) Prior Publication Data
US 2024/0305660 A1 Sep. 12, 2024

(51) Int. Cl.
*H04L 9/40* (2022.01)
(52) U.S. Cl.
CPC ...... *H04L 63/1433* (2013.01); *H04L 63/1416* (2013.01)
(58) Field of Classification Search
CPC .............. H04L 63/1433; H04L 63/1416
See application file for complete search history.

(56) References Cited

U.S. PATENT DOCUMENTS

| | | | |
|---|---|---|---|
| 8,468,244 B2* | 6/2013 | Redlich | G06Q 50/18 715/255 |
| 8,943,594 B1* | 1/2015 | Arrowood | H04L 63/1491 726/23 |
| 9,015,793 B2* | 4/2015 | Von Bokern | H04L 63/0876 726/1 |
| 9,143,392 B2* | 9/2015 | Duchesneau | H04L 41/04 |
| 9,323,935 B2* | 4/2016 | Condry | G06F 21/577 |
| 9,332,028 B2* | 5/2016 | Xaypanya | H04L 63/145 |
| 9,552,495 B2* | 1/2017 | Yang | G06F 11/1407 |
| 9,628,501 B2* | 4/2017 | Datta Ray | G06Q 10/0635 |
| 10,185,835 B2* | 1/2019 | Cavanaugh | G06F 21/604 |

(Continued)

FOREIGN PATENT DOCUMENTS

WO WO-2021225650 A1 * 11/2021 ......... G06F 9/45558

*Primary Examiner* — Richard G Keehn
(74) *Attorney, Agent, or Firm* — Moore & Van Allen PLLC; Nicholas C. Russell

(57) ABSTRACT

A system is provided for containerization-based countermeasures to cybersecurity vulnerabilities. In particular, the system may generate one or more containers (e.g., virtual environments), where each container may be configured to execute one or more tasks. At least a portion of the containers may be decoy containers that may be executing one or more decoy tasks. The system may then use a randomized process to change which containers are decoy and/or which tasks or jobs are executed within each container. Each container may be associated with a cryptographic key such that each container may be hashed by the system and compared against a reference hash associated with the container. If the hash has changed, the system may determine that the container has been modified and subsequently implement one or more intelligent remediation processes.

20 Claims, 4 Drawing Sheets

(56) References Cited

U.S. PATENT DOCUMENTS

| | | | | |
|---|---|---|---|---|
| 10,237,300 B2* | 3/2019 | Gazit | .................. | H04L 63/1408 |
| 10,333,926 B2* | 6/2019 | Von Bokern | ............ | H04L 41/28 |
| 10,333,951 B1* | 6/2019 | Natanzon | ............ | H04L 63/1425 |
| 10,341,321 B2* | 7/2019 | Kumar | .................... | H04L 63/08 |
| 10,425,411 B2* | 9/2019 | Huang | ................ | G06F 9/45558 |
| 10,432,650 B2* | 10/2019 | Staniford | ............ | H04L 63/1425 |
| 10,438,001 B1* | 10/2019 | Hariprasad | ............ | G06F 21/577 |
| 10,454,903 B2* | 10/2019 | Neal | ...................... | H04L 9/0822 |
| 10,521,584 B1* | 12/2019 | Sharifi Mehr | ...... | H04L 63/1433 |
| 10,628,597 B2* | 4/2020 | Berger | .................. | G06F 21/554 |
| 10,834,061 B2* | 11/2020 | Humphries | .......... | G06F 21/6218 |
| 10,873,601 B1* | 12/2020 | Stickle | ................ | H04L 63/1416 |
| 10,897,472 B1* | 1/2021 | Viglione | ............. | H04L 63/1491 |
| 11,190,544 B2* | 11/2021 | Rieke | ....................... | H04L 63/20 |
| 11,438,253 B2* | 9/2022 | Lewis | .................. | H04L 63/0218 |
| 2013/0139265 A1* | 5/2013 | Romanenko | ........... | G06F 21/561 |
| | | | | 726/24 |
| 2014/0053233 A1* | 2/2014 | Jacobs | .................... | H04L 63/20 |
| | | | | 726/1 |
| 2017/0180421 A1* | 6/2017 | Shieh | ...................... | H04L 63/10 |
| 2017/0302696 A1* | 10/2017 | Schutz | .................. | G06F 21/554 |
| 2018/0103061 A1* | 4/2018 | Allen | .................... | G06F 11/301 |
| 2018/0114012 A1* | 4/2018 | Sood | ........................ | G06F 21/79 |
| 2018/0211047 A1* | 7/2018 | Olson | ................. | H04L 63/1433 |
| 2019/0354729 A1* | 11/2019 | Krawczewicz | ....... | H04L 9/3234 |
| 2021/0352104 A1* | 11/2021 | Sampat | ............... | H04L 63/0236 |
| 2023/0164184 A1* | 5/2023 | Kothari | ............... | H04L 63/1416 |
| | | | | 726/23 |
| 2023/0231880 A1* | 7/2023 | Hamill | ................ | H04L 63/1416 |
| | | | | 726/23 |

* cited by examiner

SYSTEM FOR CONTAINERIZATION-BASED COUNTERMEASURES TO CYBERSECURITY VULNERABILITIES

FIELD OF THE INVENTION

The present invention embraces a system for containerization-based countermeasures to cybersecurity vulnerabilities.

BACKGROUND

There is a need for a secure way to increase the effectiveness of countermeasures against various cybersecurity vulnerabilities.

SUMMARY

The following presents a simplified summary of one or more embodiments of the present invention, in order to provide a basic understanding of such embodiments. This summary is not an extensive overview of all contemplated embodiments and is intended to neither identify key or critical elements of all embodiments nor delineate the scope of any or all embodiments. Its sole purpose is to present some concepts of one or more embodiments of the present invention in a simplified form as a prelude to the more detailed description that is presented later.

A system is provided for containerization-based countermeasures to cybersecurity vulnerabilities. In particular, the system may generate one or more containers (e.g., virtual environments), where each container may be configured to execute one or more tasks. At least a portion of the containers may be decoy containers that may be executing one or more decoy tasks. The system may then use a randomized process to change which containers are decoy and/or which tasks or jobs are executed within each container. Each container may be associated with a cryptographic key such that each container may be hashed by the system and compared against a reference hash associated with the container. If the hash has changed, the system may determine that the container has been modified and subsequently implement one or more intelligent remediation processes. In this way, the system may provide a secure solution to various cybersecurity vulnerabilities by obfuscating the characteristics or nature of the real tasks executed within the various containers.

Accordingly, embodiments of the present disclosure provide a system for a system for containerization-based countermeasures to cybersecurity vulnerabilities, the system comprising a processing device; a non-transitory storage device containing instructions when executed by the processing device, causes the processing device to perform the steps of generating one or more containers, wherein each of the one or more containers executes a computing task, wherein the one or more containers comprise one or more decoy containers, wherein each of the one or more decoy containers executes a decoy computing task; generating a baseline container hash for each of the one or more containers by inputting data and metadata associated with each of the one or more containers into a hash algorithm; based on detecting a triggering event, generating a current container hash for a first container by inputting current data and metadata associated with the first container into the hash algorithm; based on detecting a mismatch between the current container hash of the first container and a baseline container hash of the first container, determining that the first container has been compromised; and based on determining that the first container has been compromised, executing one or more remediation processes to secure the first container.

In some embodiments, the first container is configured to execute a first core computing task, wherein a second container of the one or more containers is a decoy container configured to execute a first decoy computing task, wherein the instructions further cause the processing device to perform the steps of reconfiguring the first container to execute a second decoy computing task; and reconfiguring the second container to execute a second core computing task.

In some embodiments, the first container is encrypted using a first encryption algorithm and a first encryption key, wherein a second container of the one or more containers is encrypted using a second encryption algorithm and a second encryption key.

In some embodiments, the instructions further cause the processing device to perform the steps of re-encrypting the first container using the second encryption algorithm and a third encryption key; and re-encrypting the second container using the first encryption algorithm and a fourth encryption key.

In some embodiments, the first container comprises a nested container structure, the nested container structure comprising a second container, wherein the second container comprises a third container.

In some embodiments, the one or more remediation processes comprises a deletion of at least a portion of the first container.

In some embodiments, the one or more remediation processes comprises isolation of the first container in a sandbox non-production environment.

Embodiments of the present disclosure also provide a computer program product for containerization-based countermeasures to cybersecurity vulnerabilities, the computer program product comprising a non-transitory computer-readable medium comprising code causing an apparatus to perform the steps of generating one or more containers, wherein each of the one or more containers executes a computing task, wherein the one or more containers comprise one or more decoy containers, wherein each of the one or more decoy containers executes a decoy computing task; generating a baseline container hash for each of the one or more containers by inputting data and metadata associated with each of the one or more containers into a hash algorithm; based on detecting a triggering event, generating a current container hash for a first container by inputting current data and metadata associated with the first container into the hash algorithm; based on detecting a mismatch between the current container hash of the first container and a baseline container hash of the first container, determining that the first container has been compromised; and based on determining that the first container has been compromised, executing one or more remediation processes to secure the first container.

In some embodiments, the first container is configured to execute a first core computing task, wherein a second container of the one or more containers is a decoy container configured to execute a first decoy computing task, wherein the code further causes the apparatus to perform the steps of reconfiguring the first container to execute a second decoy computing task; and reconfiguring the second container to execute a second core computing task.

In some embodiments, the first container is encrypted using a first encryption algorithm and a first encryption key, wherein a second container of the one or more containers is encrypted using a second encryption algorithm and a second encryption key.

In some embodiments, the code further causes the apparatus to perform the steps of re-encrypting the first container using the second encryption algorithm and a third encryption key; and re-encrypting the second container using the first encryption algorithm and a fourth encryption key.

In some embodiments, the first container comprises a nested container structure, the nested container structure comprising a second container, wherein the second container comprises a third container.

In some embodiments, the one or more remediation processes comprises a deletion of at least a portion of the first container.

Embodiments of the present disclosure also provide a computer-implemented method for containerization-based countermeasures to cybersecurity vulnerabilities, the computer-implemented method comprising generating one or more containers, wherein each of the one or more containers executes a computing task, wherein the one or more containers comprise one or more decoy containers, wherein each of the one or more decoy containers executes a decoy computing task; generating a baseline container hash for each of the one or more containers by inputting data and metadata associated with each of the one or more containers into a hash algorithm; based on detecting a triggering event, generating a current container hash for a first container by inputting current data and metadata associated with the first container into the hash algorithm; based on detecting a mismatch between the current container hash of the first container and a baseline container hash of the first container, determining that the first container has been compromised; and based on determining that the first container has been compromised, executing one or more remediation processes to secure the first container.

In some embodiments, the first container is configured to execute a first core computing task, wherein a second container of the one or more containers is a decoy container configured to execute a first decoy computing task, wherein the computer-implemented method further comprises reconfiguring the first container to execute a second decoy computing task; and reconfiguring the second container to execute a second core computing task.

In some embodiments, the first container is encrypted using a first encryption algorithm and a first encryption key, wherein a second container of the one or more containers is encrypted using a second encryption algorithm and a second encryption key.

In some embodiments, the computer-implemented method further comprises re-encrypting the first container using the second encryption algorithm and a third encryption key; and re-encrypting the second container using the first encryption algorithm and a fourth encryption key.

In some embodiments, the first container comprises a nested container structure, the nested container structure comprising a second container, wherein the second container comprises a third container.

In some embodiments, the one or more remediation processes comprises a deletion of at least a portion of the first container.

In some embodiments, the one or more remediation processes comprises isolation of the first container in a sandbox non-production environment.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1A:
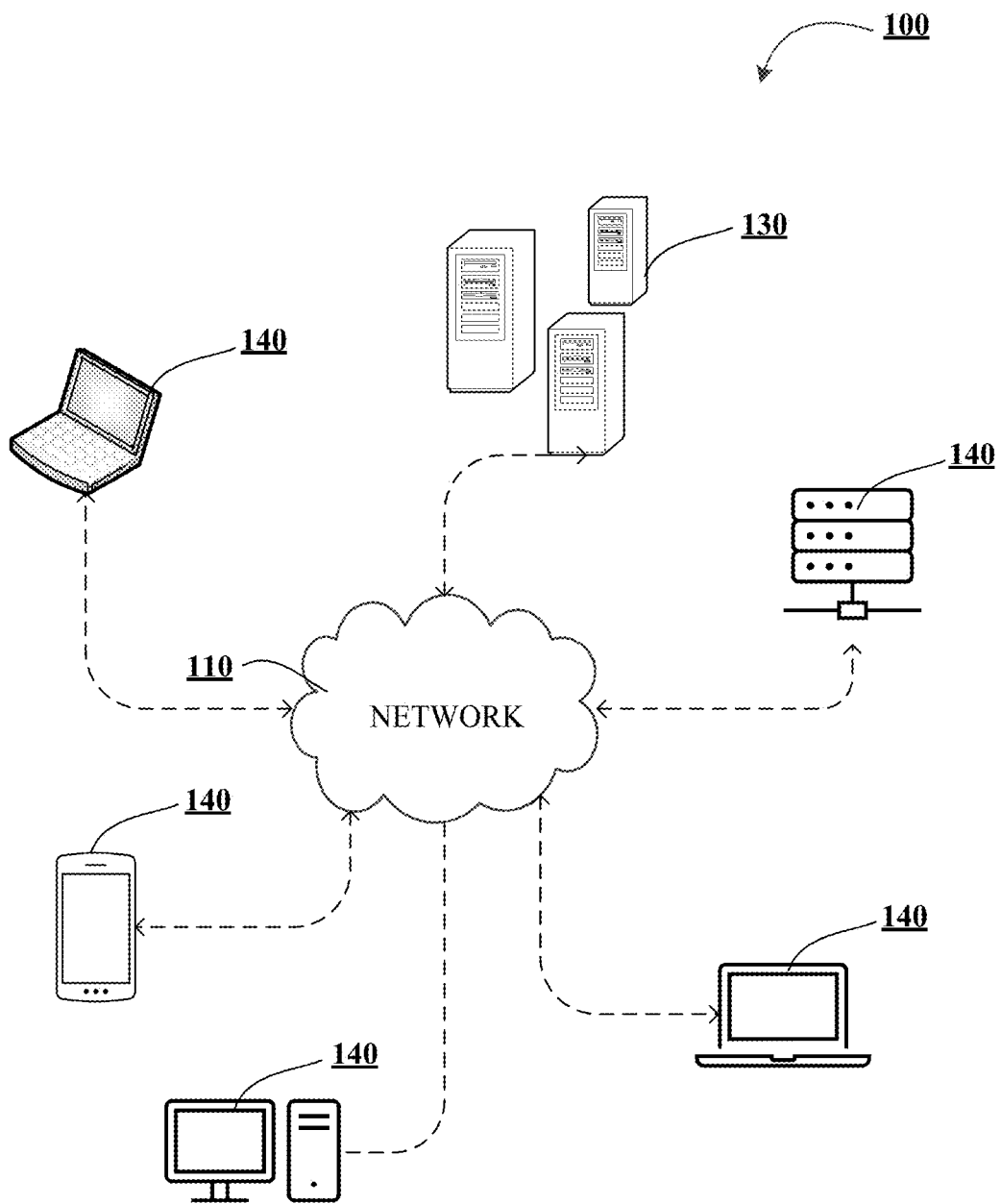
Figure 1B:
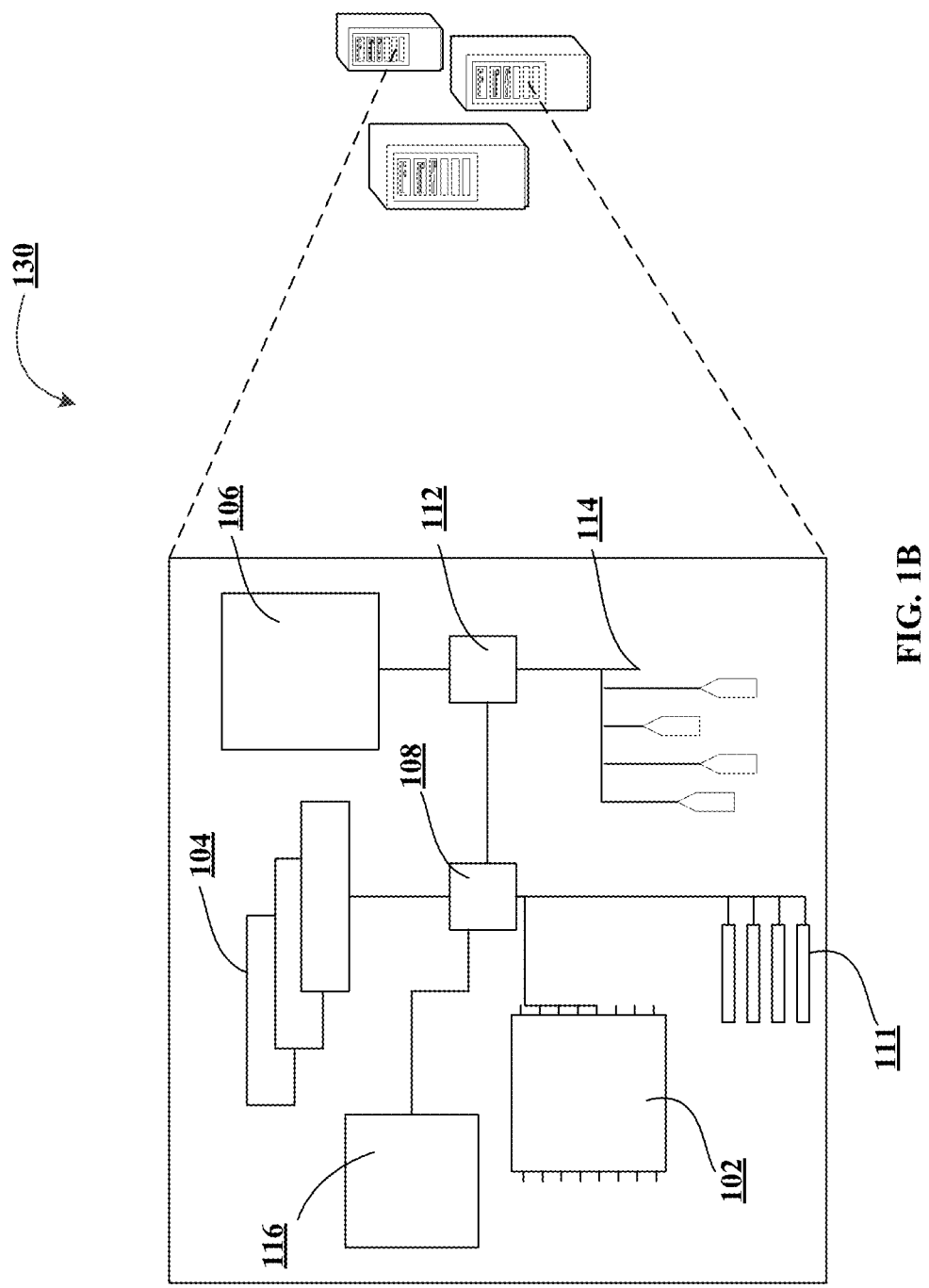
Figure 1C:
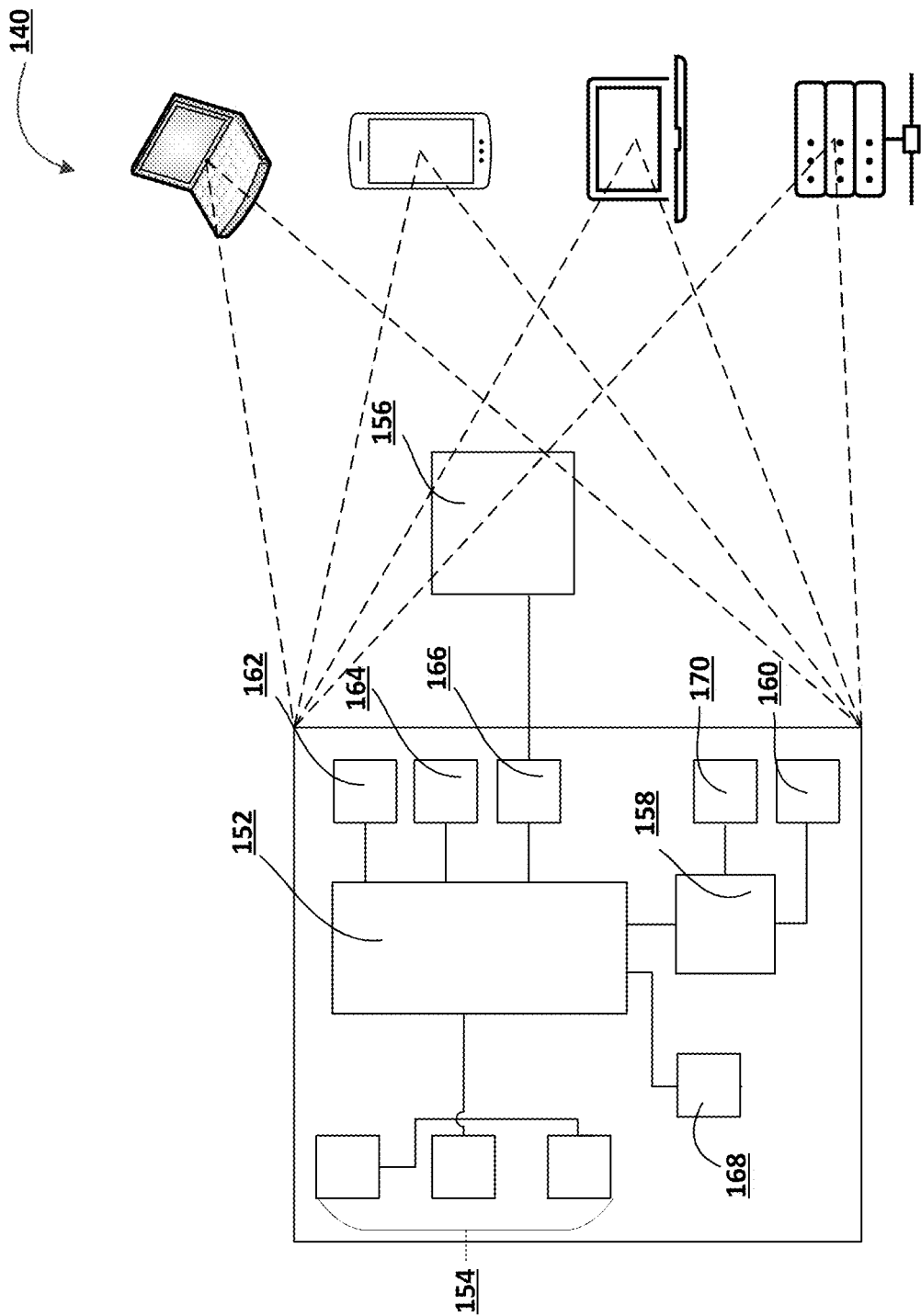
Figure 2:
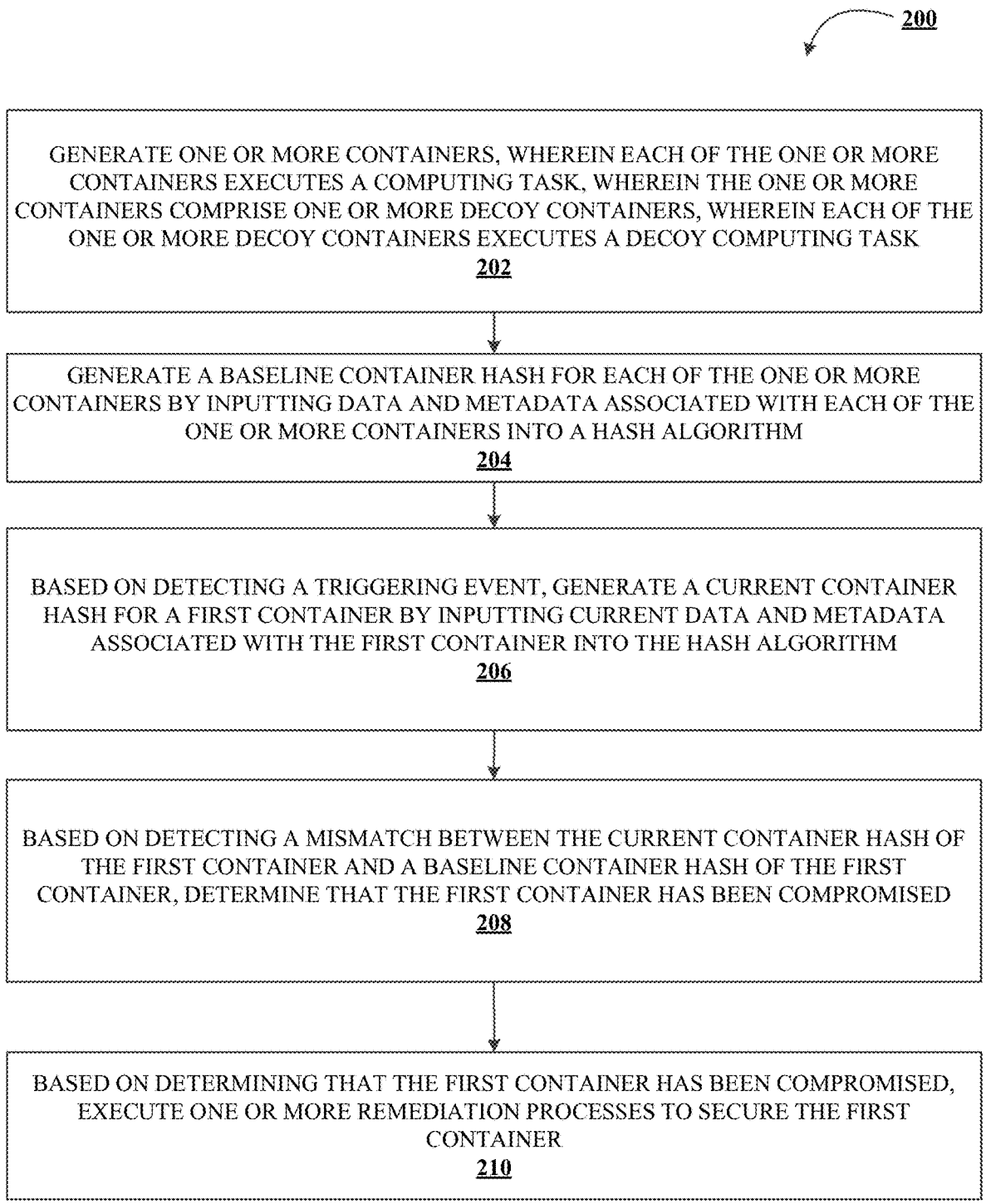

Having thus described embodiments of the invention in general terms, reference will now be made the accompanying drawings, wherein:

FIGS. 1A-1C illustrates technical components of an exemplary distributed computing environment for the system for containerization-based countermeasures to cybersecurity vulnerabilities, in accordance with an embodiment of the present disclosure; and FIG. 2 illustrates a process flow for containerization-based countermeasures to cybersecurity vulnerabilities, in accordance with an embodiment of the present disclosure.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, the user may be an employee (e.g., an associate, a project manager, an IT specialist, a manager, an administrator, an internal operations analyst, or the like) of the entity or enterprises affiliated with the entity.

As used herein, a "user interface" may be a point of human-computer interaction and communication in a device that allows a user to input information, such as commands or data, into a device, or that allows the device to output information to the user. For example, the user interface includes a graphical user interface ("GUI") or an interface to input computer-executable instructions that direct a processor to carry out specific functions. The user interface typically employs certain input and output devices such as a display, mouse, keyboard, button, touchpad, touch screen, microphone, speaker, LED, light, joystick, switch, buzzer, bell, and/or other user input/output device for communicating with one or more users.

As used herein, an "engine" may refer to core elements of an application, or part of an application that serves as a foundation for a larger piece of software and drives the functionality of the software. In some embodiments, an engine may be self-contained, but externally-controllable code that encapsulates powerful logic designed to perform or execute a specific type of function. In one aspect, an engine may be underlying source code that establishes file hierarchy, input and output methods, and how a specific part of an application interacts or communicates with other software and/or hardware. The specific components of an engine may vary based on the needs of the specific application as part of the larger piece of software. In some embodiments, an engine may be configured to retrieve resources created in other applications, which may then be ported into the engine for use during specific operational aspects of the engine. An engine may be configurable to be implemented within any general purpose computing system. In doing so, the engine may be configured to execute source code embedded therein to control specific features of the general purpose computing system to execute specific computing operations, thereby transforming the general purpose system into a specific purpose computing system.

As used herein, "authentication credentials" may be any information that can be used to identify of a user. For example, a system may prompt a user to enter authentication information such as a username, a password, a personal identification number (PIN), a passcode, individual characteristic data (e.g., iris recognition, retina scans, fingerprints, finger veins, palm veins, palm prints, digital bone anatomy/structure and positioning of distal phalanges, intermediate phalanges, proximal phalanges, and/or the like), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, one or more devices, nodes, clusters, or systems within the distributed computing environment described herein. For example, an interaction may refer to a transfer of data between devices, an accessing of stored data by one or more nodes of a computing cluster, a transmission of a requested task, or the like.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, and the like.

As used herein, "resource" may generally refer to physical or virtual objects that may be used to accomplish the entity's objectives. In this regard, the resources may include computing resources such as processing power, memory allocation, cache space, storage space, data files, network connections and/or bandwidth, electrical power, input/output functions, and the like, or data files (e.g., document files, media files, system files, and/or the like). In other embodiments, resources may refer to financial resources such as funds or digital currencies, where such resources may be linked to an account associated with a user.

As used herein, "cybersecurity vulnerability" may refer to a weakness in a computing system or environment that may be used by unauthorized entities to gain control of or access to the components of the system or environment (e.g., data). For instance, such a vulnerability may exist from suboptimal configurations or settings, outdated software, design flaws, and/or the like. In some embodiments, the vulnerability may exist based on factors or parameters that are external to the system itself. For instance, a potential unauthorized user may gain access to secret or proprietary information by analyzing the network traffic (e.g., the flow of data) to and from the system. Such cybersecurity vulnerabilities may be referred to herein as "side-channel vulnerabilities."

As used herein, "encryption algorithm" may refer to a set of mathematical and/or logical operations used to transform plaintext (e.g., readable text) to ciphertext (e.g., unreadable text). Data that has been encrypted using the encryption algorithm may require decryption (e.g., using a decryption key) before the data is able to be read or used by a computing device. Examples of encryption algorithms may include symmetric key encryption algorithms (e.g., encryption algorithms that use the same key for decryption and encryption) such as AES, Twofish, DES, and the like, or asymmetric key encryption algorithms (e.g., encryption algorithms that use different keys for decryption and decryption), such as RSA, DSS, and the like.

As used herein, "container" may refer to real or virtual computing units that may comprise all of the hardware and/or software resources required to execute processing tasks or jobs. The containers may be hosted and operated in both cloud and non-cloud environments independently of other containers. Accordingly, the jobs within the containers may be executed in parallel with one another. In some embodiments, a single container may execute multiple jobs. In other embodiments, one or more processes of a particular resource-intensive or large job or application may be executed across multiple containers in a coordinated, distributed manner.

Side-channel vulnerabilities may exist within an entity's computing system or network that may allow users or entities to gain unauthorized access to data or information by analyzing various characteristics or parameters associated with such a system or network. For instance, an unauthorized entity may monitor a flow of data to and from the system and/or network for parameters such as the volume of network traffic, the speed or frequency of data transfers, the types of data transferred, and/or the like. Based on monitoring and analyzing the various parameters, the unauthorized user may derive or determine weaknesses in the cybersecurity posture of the entity's systems and/or networks. For example, the unauthorized user may monitor network traffic between a particular computing system and a server. Based on analyzing the type of network traffic (e.g., whether or not the data is encrypted, the number of back-and-forth transmissions between the computing system and server, the time periods and/or frequency of the transmissions, and/or the like), the unauthorized user may determine that the computing system is running an application that sends authentication data to the server to access the data stored therein. Accordingly, an entity may wish to implement preventative and/or remediation-based measures to the computing system and/or network to obfuscate system processes and/or architecture, thereby preventing unauthorized parties from harvesting information in an unauthorized or unintended manner.

To address the technical problems as described above among others, the system as described herein provides containerization-based countermeasures to cybersecurity vulnerabilities. In this regard, an entity's computing environment may comprise one or more computing systems that may host and operate one or more containers that may execute one or more computing tasks or jobs. At least a portion of the one or more containers and/or one or more computing tasks may be "real" or "priority" containers or tasks (e.g., containers or tasks that are maintained and/or executed during the normal operations of the computing network environment). Another portion of the one or more containers and/or one or more computing tasks may be decoy containers and/or decoy computing tasks that may be maintained and/or executed for the purpose of obfuscating the various parameters associated with running the real or priority tasks, thereby hindering the ability of the unauthorized user to make correlation-based attacks by monitoring the network traffic or processes or data within each container.

By running the decoy containers and/or decoy tasks, the system may add "noise" to the network traffic associated with the one or more containers and/or one or more tasks as a whole, which in turn may prevent unauthorized monitoring parties from obtaining information about the computing network and/or the processes executed therein. Furthermore, by running the decoy containers and/or decoy tasks, even if an unauthorized user gains access to a particular container, the system may reduce the incidence of the unauthorized user gaining control or access to the data processed by the real or priority tasks. In an exemplary embodiment, an entity such as a financial institution may use containers to execute resource transfers (e.g., transactions) involving user accounts. Accordingly, the decoy tasks executed within decoy containers may make use of decoy data that may be processed in the same way that real data is processed (e.g., decoy account information, decoy user data, decoy transaction information, and/or the like). Accordingly, the decoy data may conform to the same characteristics as the real data (e.g., data type or format, character string length, character type settings, and/or the like), such that the decoy data appears to be indistinguishable from the real data to the unauthorized user.

In some embodiments, the system may perform a load balancing function to dynamically activate additional decoy containers and/or deactivate currently running decoy containers depending on the concentration of network traffic at a given point in time. In this regard, incoming and outgoing network traffic to and from the entity's systems may naturally increase or decrease during certain time periods (e.g., certain times of day, certain days or weeks of the year, and/or the like). Accordingly, the load balancing function may normalize the apparent volume of network traffic. For instance, during periods in which network traffic is relatively low, the system may increase the number of decoy containers and/or the number of running decoy processes, whereas in periods in which network traffic is relatively high, the system may decrease the number of decoy containers and/or the number of running decoy processes. In this way, the system may impede the ability of potentially unauthorized entities who may be monitoring the entity's network traffic to create inferences regarding the entity's systems (e.g., the entity's cybersecurity posture).

Each container may be encrypted using an encryption algorithm to protect against unauthorized users gaining access to the data processed within each container. In some embodiments, different containers may be encrypted using different encryption algorithms and/or different encryption keys. For instance, a first container may be encrypted using a first encryption algorithm and/or first encryption key, and a second container may be encrypted using a second encryption algorithm and/or a second encryption key. Accordingly, even if an unauthorized user gains access to the first container (e.g., by gaining access to the first encryption key, by breaking the encryption on the first container, and/or the like), the unauthorized user will still be unable to access the data within the second container, thereby limiting the amount of exposure of the system. It should be understood that any number of different encryption algorithms and/or encryption keys may be used within a particular container, depending on the needs of the entity (e.g., a third encryption algorithm and a third encryption key, fourth encryption algorithm and a fourth encryption key, and the like).

In some embodiments, the system may use a nested container structure in which a first container may be stored within a second container, such that the second container must be decrypted before the first container may be accessed. Furthermore, the second container may in turn be stored within a third container, which may in some embodiments be stored within a fourth container, and the like. The number of levels or layers within the nested container structure may be selected by the system based on the sensitivity of the applications, data, or tasks running within the nested container structure. For instance, nested container structures that are used to run particularly sensitive processes or applications may have a relatively greater number of layers (e.g., a greater number of nested containers) than nested container structures that may be used to run less critical processes or applications. In some embodiments, the system may use different encryption algorithms and/or encryption keys for some or all of the containers within the nested container structure. In such scenarios, the innermost container within the nested container structure may be used to store or run particularly sensitive or critical data or processes, requiring decryption of all of the containers that are exterior to the innermost container.

In some embodiments, the system may perform clustering of the components and/or processes that are run within particular containers, separating the components and/or processes into clusters or layers. In such embodiments, the clusters within each container may in turn be encrypted using different encryption algorithms and/or encryption keys (e.g., a first cluster within a container may be encrypted using one encryption algorithm, while a second cluster within the same container may be encrypted using another encryption algorithm). In this way, even if unauthorized access is gained to a particular container, at least a portion of the clusters within the container may still remain encrypted and thus protected from unauthorized access or use.

In some embodiments, the system may periodically (e.g., at fixed intervals or at randomized intervals) change the encryption algorithms and/or encryption keys that are used to encrypt at least a portion of the containers running within the entity's networked environment. For instance, a first container may be encrypted using a first encryption algorithm and first key, whereas a second container may be encrypted using a second encryption algorithm and second key. Based on detecting an event trigger (e.g., the threshold amount of time has elapsed), the system may set the first container to be encrypted using a third encryption algorithm and third key and the second container to be encrypted using a fourth encryption algorithm and a fourth key.

In some embodiments, the system may further periodically (e.g., at fixed intervals or at randomized intervals) change which jobs, tasks, data, applications, and/or the like are stored or processed in the various containers. Furthermore, the system may change which containers are running real tasks or jobs or hosting real data, and which containers are running decoy tasks or jobs or hosting decoy data. For instance, a first container may be running a first task, which may be a real task, while a second container may be running a second task, which may be a decoy task. Upon detecting an event trigger, the system may set the first container to run a third task, which may be a decoy task, and the second container to run a fourth task, which may be a real task. By switching which containers are running real tasks and which are running decoy tasks, unauthorized users who may be monitoring the containers may find it difficult to discern which containers are running real tasks or hosting real data at any given point in time.

The system may execute an integrity validation process to verify the status of the various containers used by the system. In this regard, data and/or metadata associated with the container (e.g., container header information, alphanumeric container identifiers, data stored and/or processed by tasks running within the container, and/or the like) may serve as inputs into a hash algorithm (e.g., SHA, MD5, and/or the like) to output a baseline container hash associated with the container. The various baseline container hashes may be stored (e.g., in a container hash database) for subsequent integrity validation checks. In this regard, the system may periodically (or upon user request) initiate the integrity validation check on a selected container by inputting the current data and/or metadata associated with the container into the designated hash algorithm to generate a current container hash. The current container hash may be verified against the baseline container hash stored within the container hash database. If a match is detected, the system may determine that the container has not been compromised.

However, if the system detects a mismatch between the current container hash and the baseline container hash, the system may determine that the container has been compromised (e.g., the data or applications within the container have been modified by an unauthorized user, process, or entity, or due to another issue such as data corruption). In such an embodiment, the system may implement one or more remediation processes in response to determining that the container has been compromised. In this regard, the system may implement the one or more remediation processes based on an escalating series of remediation processes depending on the nature of the compromise of the container as well as the sensitivity of the applications, data, or jobs within the container.

For instance, if the system detects that a non-critical container has been compromised (e.g., containers that store data that carry a low chance of negative consequences if improperly accessed), the system may implement remediation processes such as restarting or restoring one or more components (e.g., data, applications, libraries, and/or the like) within the container from backups or snapshots, quarantining or isolating the container within a virtual or sandbox non-production environment for further analysis, applying software or firmware updates, re-encrypting some or all of the container using a different encryption algorithm or key, and/or the like. On the other hand, in the case that a container contains particularly sensitive applications, data, or jobs, the system may implement more disruptive remediation processes, such as deleting one or more components within the container or completely deleting the container. In some embodiments, the system may further execute remediation processes on decoy containers, where the specific remediation processes that are executed may be proportional to the frequency at which such remediation processes are implemented historically. For example, if the system detects that the ratio of quarantining a container versus a full container wipe is 9 to 1, the system may maintain the ration when executing the remediation processes on the decoy containers. In this way, potentially unauthorized users who may be monitoring the activity of the entity's system may not be able to readily determine which of the containers is a decoy container and which of them is running a real or vital application or task.

The system as described herein provides a number of technological benefits over conventional cybersecurity systems. In particular, through the use of decoy containers, applications, data, and processes, the system may obfuscate the inner workings of an entity's network environment, which in turn strengthens the cybersecurity posture of the system as a whole. Furthermore, the option to use a nested container structure and clustering of components, the system may reduce the potential for negative consequences in the event that a particular container or component is compromised.

FIGS. 1A-1C illustrate technical components of an exemplary distributed computing environment 100 for the system for containerization-based countermeasures to cybersecurity vulnerabilities. As shown in FIG. 1A, the distributed computing environment 100 contemplated herein may include a system 130, an end-point device(s) 140, and a network 110 over which the system 130 and end-point device(s) 140 communicate therebetween. FIG. 1A illustrates only one example of an embodiment of the distributed computing environment 100, and it will be appreciated that in other embodiments one or more of the systems, devices, and/or servers may be combined into a single system, device, or server, or be made up of multiple systems, devices, or servers. For instance, the functions of the system 130 and the endpoint devices 140 may be performed on the same device (e.g., the endpoint device 140). Also, the distributed computing environment 100 may include multiple systems, same or similar to system 130, with each system providing portions of the necessary operations (e.g., as a server bank, a group of blade servers, or a multi-processor system).

In some embodiments, the system 130 and the end-point device(s) 140 may have a client-server relationship in which the end-point device(s) 140 are remote devices that request and receive service from a centralized server, i.e., the system 130. In some other embodiments, the system 130 and the end-point device(s) 140 may have a peer-to-peer relationship in which the system 130 and the end-point device(s) 140 are considered equal and all have the same abilities to use the resources available on the network 110. Instead of having a central server (e.g., system 130) which would act as the shared drive, each device that is connect to the network 110 would act as the server for the files stored on it. In some embodiments, the system 130 may provide an application programming interface ("API") layer for communicating with the end-point device(s) 140.

The system 130 may represent various forms of servers, such as web servers, database servers, file server, or the like, various forms of digital computing devices, such as laptops, desktops, video recorders, audio/video players, radios, workstations, or the like, or any other auxiliary network devices, such as wearable devices, Internet-of-things devices, electronic kiosk devices, mainframes, or the like, or any combination of the aforementioned.

The end-point device(s) 140 may represent various forms of electronic devices, including user input devices such as servers, networked storage drives, personal digital assistants, cellular telephones, smartphones, laptops, desktops, and/or the like, merchant input devices such as point-of-sale (POS) devices, electronic payment kiosks, and/or the like, electronic telecommunications device (e.g., automated teller machine (ATM)), and/or edge devices such as routers, routing switches, integrated access devices (IAD), and/or the like.

The network 110 may be a distributed network that is spread over different networks. This provides a single data communication network, which can be managed jointly or separately by each network. Besides shared communication within the network, the distributed network often also supports distributed processing. The network 110 may be a form of digital communication network such as a telecommunication network, a local area network ("LAN"), a wide area network ("WAN"), a global area network ("GAN"), the Internet, or any combination of the foregoing. The network 110 may be secure and/or unsecure and may also include wireless and/or wired and/or optical interconnection technology.

It is to be understood that the structure of the distributed computing environment and its components, connections and relationships, and their functions, are meant to be exemplary only, and are not meant to limit implementations of the inventions described and/or claimed in this document. In one example, the distributed computing environment 100 may include more, fewer, or different components. In another example, some or all of the portions of the distributed computing environment 100 may be combined into a single portion or all of the portions of the system 130 may be separated into two or more distinct portions.

FIG. 1B illustrates an exemplary component-level structure of the system 130, in accordance with an embodiment of the invention. As shown in FIG. 1B, the system 130 may include a processor 102, memory 104, input/output (I/O) device 116, and a storage device 110. The system 130 may also include a high-speed interface 108 connecting to the memory 104, and a low-speed interface 112 connecting to low speed bus 114 and storage device 110. Each of the components 102, 104, 108, 110, and 112 may be operatively coupled to one another using various buses and may be mounted on a common motherboard or in other manners as appropriate. As described herein, the processor 102 may include a number of subsystems to execute the portions of processes described herein. Each subsystem may be a self-contained component of a larger system (e.g., system 130) and capable of being configured to execute specialized processes as part of the larger system.

The processor 102 can process instructions, such as instructions of an application that may perform the functions disclosed herein. These instructions may be stored in the memory 104 (e.g., non-transitory storage device) or on the storage device 110, for execution within the system 130 using any subsystems described herein. It is to be understood that the system 130 may use, as appropriate, multiple processors, along with multiple memories, and/or I/O devices, to execute the processes described herein.

The memory 104 stores information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions. The memory 104 may store, recall, receive, transmit, and/or access various files and/or information used by the system 130 during operation.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

The high-speed interface 108 manages bandwidth-intensive operations for the system 130, while the low speed controller 112 manages lower bandwidth-intensive operations. Such allocation of functions is exemplary only. In some embodiments, the high-speed interface 108 is coupled to memory 104, input/output (I/O) device 116 (e.g., through a graphics processor or accelerator), and to high-speed expansion ports 111, which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms. For example, it may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1C illustrates an exemplary component-level structure of the end-point device(s) 140, in accordance with an embodiment of the invention. As shown in FIG. 1C, the end-point device(s) 140 includes a processor 152, memory 154, an input/output device such as a display 156, a communication interface 158, and a transceiver 160, among other components. The end-point device(s) 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the end-point device(s) 140, including instructions stored in the memory 154, which in one embodiment includes the instructions of an application that may perform the functions disclosed herein, including certain logic, data processing, and data storing functions. The processor may be implemented as a chipset of chips that include separate and multiple analog and digital processors. The processor may be configured to provide, for example, for coordination of the other components of the end-point device(s) 140, such as control of user interfaces, applications run by end-point device(s) 140, and wireless communication by end-point device(s) 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of end-point device(s) 140 with other devices. External interface 168 may provide, for example, for wired communication in some implementations, or for wireless communication in other implementations, and multiple interfaces may also be used.

The memory 154 stores information within the end-point device(s) 140. The memory 154 can be implemented as one or more of a computer-readable medium or media, a volatile memory unit or units, or a non-volatile memory unit or units. Expansion memory may also be provided and connected to end-point device(s) 140 through an expansion interface (not shown), which may include, for example, a SIMM (Single In Line Memory Module) card interface. Such expansion memory may provide extra storage space for end-point device(s) 140 or may also store applications or other information therein. In some embodiments, expansion memory may include instructions to carry out or supplement the processes described above and may include secure information also. For example, expansion memory may be provided as a security module for end-point device(s) 140 and may be programmed with instructions that permit secure use of end-point device(s) 140. In addition, secure applications may be provided via the SIMM cards, along with additional information, such as placing identifying information on the SIMM card in a non-hackable manner.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the end-point device(s) 140 to transmit and/or receive information or commands to and from the system 130 via the network 110. Any communication between the system 130 and the end-point device(s) 140 may be subject to an authentication protocol allowing the system 130 to maintain security by permitting only authenticated users (or processes) to access the protected resources of the system 130, which may include servers, databases, applications, and/or any of the components described herein. To this end, the system 130 may trigger an authentication subsystem that may require the user (or process) to provide authentication credentials to determine whether the user (or process) is eligible to access the protected resources. Once the authentication credentials are validated and the user (or process) is authenticated, the authentication subsystem may provide the user (or process) with permissioned access to the protected resources. Similarly, the end-point device(s) 140 may provide the system 130 (or other client devices) permissioned access to the protected resources of the end-point device(s) 140, which may include a GPS device, an image capturing component (e.g., camera), a microphone, and/or a speaker.

The end-point device(s) 140 may communicate with the system 130 through communication interface 158, which may include digital signal processing circuitry where necessary. Communication interface 158 may provide for communications under various modes or protocols, such as the Internet Protocol (IP) suite (commonly known as TCP/IP). Protocols in the IP suite define end-to-end data handling methods for everything from packetizing, addressing and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications. In addition, the communication interface 158 may provide for communications under various telecommunications standards (2G, 3G, 4G, 5G, and/or the like) using their respective layered protocol stacks. These communications may occur through a transceiver 160, such as radio-frequency transceiver. In addition, short-range communication may occur, such as using a Bluetooth, Wi-Fi, or other such transceiver (not shown). In addition, GPS (Global Positioning System) receiver module 170 may provide additional navigation- and location-related wireless data to end-point device(s) 140, which may be used as appropriate by applications running thereon, and in some embodiments, one or more applications operating on the system 130.

The end-point device(s) 140 may also communicate audibly using audio codec 162, which may receive spoken information from a user and convert it to usable digital information. Audio codec 162 may likewise generate audible sound for a user, such as through a speaker, e.g., in a handset of end-point device(s) 140. Such sound may include sound from voice telephone calls, may include recorded sound (e.g., voice messages, music files, etc.) and may also include sound generated by one or more applications operating on the end-point device(s) 140, and in some embodiments, one or more applications operating on the system 130.

Various implementations of the distributed computing environment 100, including the system 130 and end-point device(s) 140, and techniques described here can be realized in digital electronic circuitry, integrated circuitry, specially designed ASICs (application specific integrated circuits), computer hardware, firmware, software, and/or combinations thereof.

FIG. 2 illustrates a process flow 200 for containerization-based countermeasures to cybersecurity vulnerabilities, in accordance with an embodiment of the present disclosure. The process begins at block 202, where the system generates one or more containers, wherein each of the one or more containers executes a computing task, wherein the one or more containers comprise one or more decoy containers, wherein each of the one or more decoy containers executes a decoy computing task. Each container may be encrypted such that the container must be decrypted (e.g., using the correct cryptographic key) in order to access the data and/or processes therein. Accordingly, the system may host and operate the one or more containers for the purposes of running tasks or applications and/or hosting data that the entity wishes to protect from unauthorized use.

In some embodiments, the system may be configured to perform a swap of which containers execute decoy tasks and which execute real tasks. For instance, the first container may be executing a first "real" or "core" task, whereas the second container may be executing a first decoy task. Upon detecting a trigger event (e.g., the passage of a threshold amount of time), the system may cause the first container to execute a second decoy task and the second container to execute a second real task.

In some embodiments, the system may be configured to execute a load balancing function based on the current incoming and outgoing network traffic of the entity's computing environment. For instance, the system may, based on detecting a decrease in network traffic, generate an additional container (e.g., a third container executing a decoy task). Conversely, upon detecting an increase in network traffic, the system may wipe the third container and/or assign a real task to the third container.

In some embodiments, at least one of the one or more containers may be encrypted using a different encryption algorithm from another of the one or more containers. For instance, a first container may be encrypted using a first encryption algorithm and/or first encryption key, and a second container may be encrypted using a second encryption algorithm and/or second encryption key. Furthermore, the first encryption algorithm may be a symmetric key algorithm, whereas the second encryption algorithm may be an asymmetric key algorithm. In such embodiments, the first encryption key may be a symmetric key, whereas the second encryption key may be a private key that may only be decrypted using a corresponding public key (e.g., a decryption key).

In some embodiments, the system may switch the encryption algorithms used to encrypt the various containers. For instance, upon detecting a trigger event, the first container, which may be encrypted using the first encryption algorithm, may be re-encrypted using the second encryption algorithm (or third encryption algorithm, or the like), whereas the second container, which may be encrypted using the second encryption algorithm, may be re-encrypted using the first encryption algorithm (or third encryption algorithm, or the like).

In some embodiments, at least a portion of the one or more containers may be nested within one another in a nested container configuration. For instance, the first container may comprise the second container such that the first container must first be decrypted before the second container is accessed. The second container may in turn comprise a third container, which in turn may comprise a fourth container, and onward up to as many containers as deemed necessary to protect the processes within the nested container structure. As described above, different encryption algorithms and/or encryption keys may be used to encrypt the various levels within the nested container structure.

In some embodiments, at least a portion of the one or more containers may separate the various tasks, applications, files, and/or data within the container into one or more clusters. As an example, the first container may comprise a first cluster comprising a first data file and a second cluster comprising a second data file. Various encryption algorithms may be used to encrypt the various clusters within the container. For example, the first cluster may be encrypted using the first encryption algorithm and the second cluster may be encrypted using the second encryption algorithm. In this way, the system provides multiple layers of security to protect the applications, files, and/or processes running within the network environment.

The process continues to block 204, where the system generates a baseline container hash for each of the one or more containers by inputting data and metadata associated with each of the one or more containers into a hash algorithm. The data and metadata associated with the container may include information such as a container identifier (e.g., a serial number, hash value, and/or the like), container timestamp, data files stored within the container, applications or tasks running in the container, libraries or other dependencies, and/or the like. Such information may be used as inputs to generate the baseline container hash using a hash algorithm such as SHA, MD5, or the like. In this way, the baseline container hash serves as a reference for running an integrity validation check on a container.

The process continues to block 206, where the system, based on detecting a triggering event, generates a current container hash for a first container by inputting current data and metadata associated with the first container into the hash algorithm. Examples of the triggering event may include, for instance, the passage of a threshold amount of time (which may be fixed or random), the detection of a potential intrusion into the network and/or one or more computing devices, manual input from a user such as an administrator, and/or the like. Accordingly, the "current" container hash may be based on the state of the container at a point in time after the baseline container hash is generated. By comparing the baseline container hash with the current container hash, the system may be able to determine whether the baseline parameters for the container have changed.

The process continues to block 208, where the system, based on detecting a mismatch between the current container hash of the first container and a baseline container hash of the first container, determines that the first container has been compromised. A modification of any of the files within the container and/or the information associated with the container will cause a mismatch in the hash values. Accordingly, the system may retrieve the baseline container hash associated with the first container (e.g., from a container hash database) and compare the current container hash for the first container with the retrieved baseline container hash.

The process continues to block 210, where the system, based on determining that the first container has been compromised, executes one or more remediation processes to secure the first container. The one or more remediation processes may be selected by the system based on the contents of the first container (e.g., the applications, processes, data, and/or the like). For instance, if the first container contains a relatively less critical or sensitive application, process, or data file, the system may use relatively less disruptive remediation processes, such as a software update, quarantining of the first container for subsequent evaluation, restoration of the first container to a previous configuration, and/or the like. On the other hand, if the first container contains a particularly critical or sensitive application, process, or data file, the system may execute a remediation process such as deletion of one or more clusters within the first container, a full wipe of the first container, and/or the like.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, micro-code, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These computer-executable program code portions execute via the processor of the computer and/or other programmable data processing apparatus and create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for containerization-based countermeasures to cybersecurity vulnerabilities, the system comprising:
   a processing device;
   a non-transitory storage device containing instructions when executed by the processing device, causes the processing device to perform the steps of:
      generating one or more containers, wherein each of the one or more containers executes a computing task, wherein the one or more containers comprise one or more decoy containers, wherein each of the one or more decoy containers executes a decoy computing task;
      generating a baseline container hash for each of the one or more containers by inputting data and metadata associated with each of the one or more containers into a hash algorithm;
      based on detecting a triggering event, generating a current container hash for a first container by inputting current data and metadata associated with the first container into the hash algorithm;
      based on detecting a mismatch between the current container hash of the first container and a baseline container hash of the first container, determining that the first container has been compromised; and
      based on determining that the first container has been compromised,
   executing one or more remediation processes to secure the first container.

2. The system of claim 1, wherein the first container is configured to execute a first core computing task, wherein a second container of the one or more containers is a decoy container configured to execute a first decoy computing task, wherein the instructions further cause the processing device to perform the steps of:
   reconfiguring the first container to execute a second decoy computing task; and
   reconfiguring the second container to execute a second core computing task.

3. The system of claim 1, wherein the first container is encrypted using a first encryption algorithm and a first encryption key, wherein a second container of the one or more containers is encrypted using a second encryption algorithm and a second encryption key.

4. The system of claim 3, wherein the instructions further cause the processing device to perform the steps of:
   re-encrypting the first container using the second encryption algorithm and a third encryption key; and
   re-encrypting the second container using the first encryption algorithm and a fourth encryption key.

5. The system of claim 1, wherein the first container comprises a nested container structure, the nested container structure comprising a second container, wherein the second container comprises a third container.

6. The system of claim 1, wherein the one or more remediation processes comprises a deletion of at least a portion of the first container.

7. The system of claim 1, wherein the one or more remediation processes comprises isolation of the first container in a sandbox non-production environment.

8. A computer program product for containerization-based countermeasures to cybersecurity vulnerabilities, the computer program product comprising a non-transitory computer-readable medium comprising code causing an apparatus to perform the steps of:
   generating one or more containers, wherein each of the one or more containers executes a computing task, wherein the one or more containers comprise one or more decoy containers, wherein each of the one or more decoy containers executes a decoy computing task;
   generating a baseline container hash for each of the one or more containers by inputting data and metadata associated with each of the one or more containers into a hash algorithm;
   based on detecting a triggering event, generating a current container hash for a first container by inputting current data and metadata associated with the first container into the hash algorithm;
   based on detecting a mismatch between the current container hash of the first container and a baseline container hash of the first container, determining that the first container has been compromised; and
   based on determining that the first container has been compromised, executing one or more remediation processes to secure the first container.

9. The computer program product of claim 8, wherein the first container is configured to execute a first core computing task, wherein a second container of the one or more containers is a decoy container configured to execute a first decoy computing task, wherein the code further causes the apparatus to perform the steps of:
   reconfiguring the first container to execute a second decoy computing task; and
   reconfiguring the second container to execute a second core computing task.

10. The computer program product of claim 8, wherein the first container is encrypted using a first encryption algorithm and a first encryption key, wherein a second container of the one or more containers is encrypted using a second encryption algorithm and a second encryption key.

11. The computer program product of claim 10, wherein the code further causes the apparatus to perform the steps of:
   re-encrypting the first container using the second encryption algorithm and a third encryption key; and
   re-encrypting the second container using the first encryption algorithm and a fourth encryption key.

12. The computer program product of claim 8, wherein the first container comprises a nested container structure, the nested container structure comprising a second container, wherein the second container comprises a third container.

13. The computer program product of claim 8, wherein the one or more remediation processes comprises a deletion of at least a portion of the first container.

14. A computer-implemented method for containerization-based countermeasures to cybersecurity vulnerabilities, the computer-implemented method comprising:
   generating one or more containers, wherein each of the one or more containers executes a computing task, wherein the one or more containers comprise one or more decoy containers, wherein each of the one or more decoy containers executes a decoy computing task;

generating a baseline container hash for each of the one or more containers by inputting data and metadata associated with each of the one or more containers into a hash algorithm;

based on detecting a triggering event, generating a current container hash for a first container by inputting current data and metadata associated with the first container into the hash algorithm;

based on detecting a mismatch between the current container hash of the first container and a baseline container hash of the first container, determining that the first container has been compromised; and based on determining that the first container has been compromised, executing one or more remediation processes to secure the first container.

15. The computer-implemented method of claim 14, wherein the first container is configured to execute a first core computing task, wherein a second container of the one or more containers is a decoy container configured to execute a first decoy computing task, wherein the computer-implemented method further comprises:

reconfiguring the first container to execute a second decoy computing task; and reconfiguring the second container to execute a second core computing task.

16. The computer-implemented method of claim 14, wherein the first container is encrypted using a first encryption algorithm and a first encryption key, wherein a second container of the one or more containers is encrypted using a second encryption algorithm and a second encryption key.

17. The computer-implemented method of claim 16, wherein the computer-implemented method further comprises:

re-encrypting the first container using the second encryption algorithm and a third encryption key; and re-encrypting the second container using the first encryption algorithm and a fourth encryption key.

18. The computer-implemented method of claim 14, wherein the first container comprises a nested container structure, the nested container structure comprising a second container, wherein the second container comprises a third container.

19. The computer-implemented method of claim 14, wherein the one or more remediation processes comprises a deletion of at least a portion of the first container.

20. The computer-implemented method of claim 14, wherein the one or more remediation processes comprises isolation of the first container in a sandbox non-production environment.

* * * * *